United States Patent [19]

Allos et al.

[11] Patent Number: 4,659,216

[45] Date of Patent: Apr. 21, 1987

[54] OPTICAL FIBRE REFLECTOMETER

[75] Inventors: Talal I. Y. Allos, Horseforth; David H. Forbes, Leeds; Christopher M. Warnes, Garsorth, all of United Kingdom

[73] Assignee: Standard Telephones and Cables Public Limited Company, London, England

[21] Appl. No.: 770,511

[22] Filed: Aug. 29, 1985

[30] Foreign Application Priority Data

Sep. 17, 1984 [GB] United Kingdom ............... 8423481

[51] Int. Cl.[4] ............................................. G01N 21/88
[52] U.S. Cl. ................................. 356/73.1; 350/96.20
[58] Field of Search .................... 350/96.20; 356/73.1

[56] References Cited

U.S. PATENT DOCUMENTS

| 4,289,398 | 9/1981 | Robichaud | 356/73.1 |
| 4,351,586 | 9/1982 | Phillips et al. | 350/96.20 |
| 4,474,431 | 10/1984 | Bricheno | 350/96.15 |

FOREIGN PATENT DOCUMENTS

| 57-22528 | 2/1982 | Japan | 356/73.1 |
| 59-45414 | 3/1984 | Japan | 350/96.2 |
| WO82/02604 | 9/1982 | PCT Int'l Appl. | |
| 2032642 | 5/1980 | United Kingdom. | |
| 1593559 | 7/1981 | United Kingdom. | |
| 2110834 | 6/1983 | United Kingdom. | |
| 2150703 | 7/1985 | United Kingdom. | |

OTHER PUBLICATIONS

Comerford et al, "Optical Fiber Coupler" IBM Technical Disclosure Bulletin, vol. 22, #7, Dec. 1979, pp. 2933-2944.

B. S. Kawasaki, K. O. Hill, 'Low Loss Access Coupler for Multimode Optical Fibre Distribution Networks', Applied Optics, vol. 16, No. 7, pp. 1794-1795, Jul. 1977.

M. P. Gold, A. H. Hartog, 'A Practical High Performance Single Mode OTDR System for the Long Wavelength Region', 9th European Conference on Optical Communications, pp. 181-184, Sep. 1983.

M. Nakazawa et al., 'Marked Extension of Diagnosis Length in Optical Time Domain Reflectometry Using a 1.32 μm YAG Laser', Electronics Letters, vol. 17, No. 2, pp. 783-784, Oct. 15 1981.

B. S. Kawasaki, K. O. Hill, and R. G. Lamont, "Biconical-Taper Single-Mode Fiber Coupler", Optics Letters, vol. 6, No. 7, pp. 327-328, (Jul. 1981).

Primary Examiner—Vincent P. McGraw
Attorney, Agent, or Firm—Kerkam, Stowell, Kondracki & Clarke

[57] ABSTRACT

An optical fibre reflectometer in which the end of the optical fibre 4-port coupler for optical coupling to test fibres is not protected from damage by the use of a sapphire window because of the problems of unwanted reflections that this engenders. Instead the end is coupled to the test fibres by means of a replaceable slug (33) containing a stub length of fibre (20). This fibre stub (20) is intrinsically just as susceptible to cumulative damage when test fibres are repeatedly butted against its end, but it protects the coupler because it is itself butted against the coupler only once in its life. When the cumulative damage becomes excessive the slug can be replaced more simply and cheaply than replacing the whole coupler.

4 Claims, 3 Drawing Figures

OPTICAL FIBRE REFLECTOMETER

BACKGROUND OF THE INVENTION

This invention relates to optical fibre reflectometers, and is particularly concerned with avoiding the problems of excessive reflection at the interface between the reflectometer and the optical fibre to be tested.

In an optical fibre reflectometer light from a source, typically an injection laser, is directed through a multi-port optical fibre coupler into the optical fibre under test. Some of the light that is backscattered in the test fibre returns to the coupler, and some of this returning light is directed into a branch of the coupler terminated with a photodetector.

For testing multimode fibre a particularly satisfactory type of coupler is one in which a vapour deposited silica (VDS) fibre (possessing a waveguiding structure within the glass), with a low index plastics coating surrounding the glass, is optically coupled in a side-by-side relationship with a plastics-clad-silica (PCS) fibre. Such a coupler is described in U.S. Pat. No. 4,474,431. When used in a reflectometer it is arranged that light from the source is launched into the core of one end of the VDS fibre, the test fibre is optically coupled with the other end of the VDS fibre, and the photodetector is optically coupled with the end of the PCS fibre adjacent the end of the VDS fibre to which the source is coupled. The cross-section of the core of the VDS fibre is chosen to be effectively smaller than that of the test fibre, while its cladding is preferably matched in size with that of the test fibre. The coupling between modes propagating in the PCS fibre and core modes of VDS fibre is very small, but the coupling between the PCS fibre and cladding modes of the VDS fibre (modes guided by the glass/plastics interface of the VDS fibre) is relatively strong. Light from the source is launched into the core of the VDS fibre of the coupler, and therefore passes through the coupler with very little attenuation. Any light backscattered in the test fibre that reaches the coupler propagating in test fibre cladding modes is launched into cladding modes of the coupler VDS fibre, where it is strongly coupled into the PCS fibre, and hence is directed to the photodetector with relatively high efficiency. Some of any light backscattered in the test fibre that reaches the coupler propagating in test fibre core modes is launched into core modes of the coupler VDS fibre. Most of this light passes straight through the coupler, and hence little reaches the photodetector. On the other hand, since the core of the coupler VDS fibre is effectively smaller than the core of the test fibre, much of the backscattered light that reaches the coupler propagating in test fibre core modes is not launched into core modes of the VDS fibre, but is launched into its cladding. This light is strongly coupled to the PCS fibre, and hence much of it reaches the detector. Under appropriate conditions the attenuation afforded by the coupler of light suffering a double pass through the coupler, finally to emerge from a different port from that by which it first entered, can be significantly less than the theoretical 6 dB minimum of a conventional biconical coupler as described for instance by B. S. Kawasaki and K. O. Hill in a paper entitled 'Low-loss access coupler for multimode optical fibre distribution networks', (Applied Optics Vol. 16 No. 7 pp 1794–5, July 1977).

The way that the test fibre is coupled to the coupler typically involves ferrule terminating both the VDS fibre of the coupler and the test fibre, and then butting the ferrules together while they are held in alignment in a Vee-groove. The termination on the VDS fibre of the coupler is, in the course of normal use, butted up many times against a large number of different test fibres. In the course of this use the end of the VDS fibre is prone to cumulative damage by scratching. Such scratching may be the result of the trapping of dirt between the mating surfaces, or because test fibres have been connected that have protruded slightly from the ends of their ferrules. To reduce this risk it has been the practice to provide the VDS fibre termination with a sapphire window which is less susceptible to scratching on account of its relative hardness.

The difference between the refractive index of sapphire and that of the optical fibres means that partial reflection occurs at the interface. Virtually all the light that is not launched into the test fibre, but is reflected back into the VDS fibre by the fibre/sapphire interfaces, is light reflected back to propagate in core modes of the VDS fibre. This is because such light was propagating in core modes before reflection, and the sapphire window is normal to the fibre axis. Thus virtually none of this light reflected by these interfaces is coupled into the PCS fibre which would direct it to the photodetector. It is seen therefore that the deleterious effect of such reflections is substantially entirely limited to the effect of the attenuation of power launched into the test fibre.

The above described coupler employing VDS and PCS fibres, while well-suited for use in reflectometers designed solely for making measurements on multimode fibres, is not best suited where is facility for making measurements on single mode fibres is additionally required. The reason for this is that the satisfactory operation of the coupler requires the core of the VDS fibre of the coupler to be significantly smaller in effective cross-section than that of the test fibre so that a significant proportion of the backscattered light will be launched, not into core modes of the VDS fibre, but into its cladding modes. It is not possible to construct a VDS fibre to have a core with an effective cross-section significantly smaller than that of a conventional single mode fibre. Therefore, when a single mode fibre testing facility for a reflectometer is required, recourse is typically had to a biconical tapered coupler (single mode or multimode) of the type previously referred to. Such a coupler is preferably made by the method described in United Kingdom Patent Specification No. 2150703. This substitution of coupler type leaves unchanged the problem of cummulative damage to the end of the fibre of the coupler to which the test fibres have to be connected. Now however the problem of refractive index mismatch reflections occasioned by the use of a sapphire window are potentially much more serious. This is because the coupler will couple substantially half the reflected power into the fibre to which the photodetector is connected. Unless special precautions are taken, it is prone to swamp the photodetector to the extent that it is unable to respond to the backscattered light that reaches it immediately after it receives the light reflected by the fibre/sapphire interfaces. This problem can be resolved by optical range-gating, for instance with a Bragg acousto-optical deflector, the optical signal before it reaches the photodetector. This is the approach of various workers in the field of optical time domain reflectometry, being described for instance by M. P. Gold and A. H. Hartog in a paper entitled 'A practical high performance single mode OTDR system for the long-wavelength region', (9th European Conference on Optical Communications, September 1983), and by M. Nakazawa et al in a paper entitled 'Marked extension of diagnosis length in Optical Time Domain Reflectometry using a 1.32 um YAG Laser' (Electronics Letters, Oct. 15, 1981 Vol. 17 No. 2 pp 783–4).

The present invention is concerned with a design of reflectometer in which the need for optical range-gating is circumvented.

SUMMARY OF THE INVENTION

According to the present invention there is provided an optical fibre reflectometer wherein one port of an optical fibre coupler is optically coupled with an optical source, a second port of the coupler is ferrule terminated for optical coupling with a test fibre, and a third port of the coupler is optically coupled with a photodetector, wherein the ferrule of the second port is fitted in an optical fibre connector provided with a replaceable slug threaded by a stub length of optical fibre that is optically interposed between the optical fibre in the ferrule and the test fibre.

The stub length of fibre is chosen to have a refractive index matching that of the ferrule terminated fibre of the coupler and also that of the test fibres so that, when index matching liquid is applied to the interfaces at both ends of the stub, reflection at these interfaces is substantially completely suppressed.

The stub length of fibre of the replaceable slug is no harder than the fibre of the coupler, and hence the end of the stub facing the test fibre is just as susceptible to damage as the fibre of the coupler would have been had the test fibre been butted directly against the coupler fibre. On the other hand it is cheaper and easier to replace the slug than the whole coupler when, after substantial use, this end has sustained an unacceptable degree of damage. The other end of the stub, the end facing the coupler, is much less prone to damage because only once in its life does it need to be butted against the coupler. The end of the fibre of the coupler facing the stub is much less prone to damage than if it were directly abutted against the test fibres firstly because the frequency with which a fibre is directly butted to the coupler is reduced by a factor equal to the average number of tests the reflectometer can make before the stub has been so worn as to need replacing, and secondly because the ends of the stub can conveniently be finished to a higher quality than it is usually convenient to require of the ends of all the test fibres.

BRIEF DESCRIPTION OF THE DRAWINGS

There follows a description of a reflectometer embodying the invention in a preferred form. The description refers to the accompanying drawings in which FIG. 1 schematically depicts the major components of the reflectometer.

DETAILED DESCRIPTION OF PREFERRED EMBODIMENT

Figure 1:
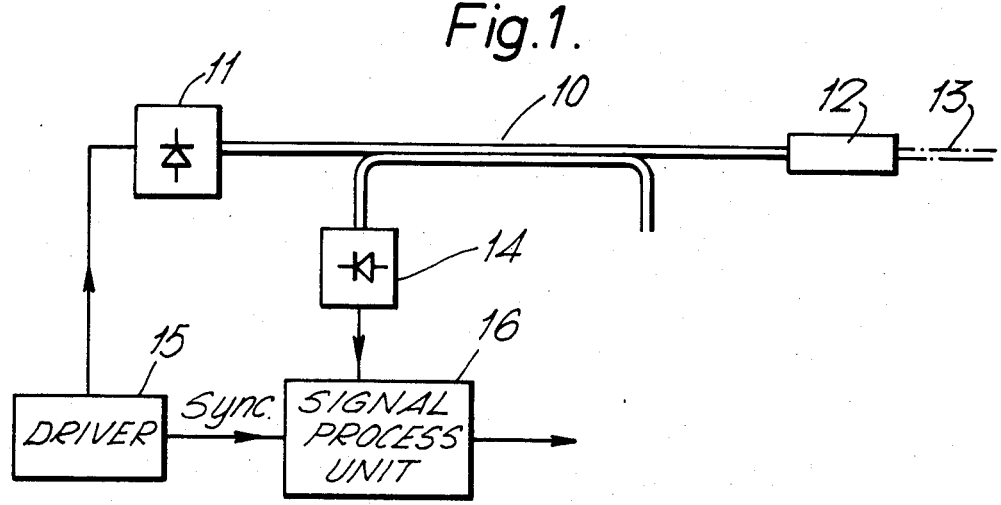

Referring to FIG. 1, the principal constituents of the reflectometer comprise a biconical four-port optical fibre coupler indicated generally at 10, an optical source 11 optically coupled with one port of the coupler 10, a connector assembly 12 for connecting a test fibre 13 to a second port of the coupler, a photodetector 14 optically coupled with a third port of the coupler, a current driver 15 for the laser 11, and a signal processing unit 16 which, with the aid of synchronisation signals from the current driver, processes the output signal it receives from the photodetector 14. For operation in the wavelength region of 1300 nm the preferred optical source is an InGaAsP laser diode, while the preferred photodetector is a germanium avalanche photodiode.

Figure 2:
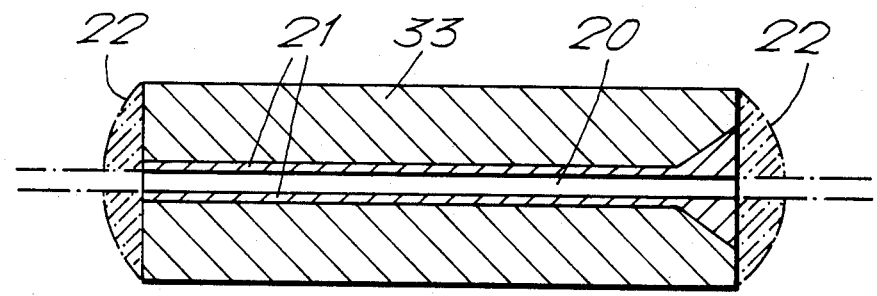
FIG. 2 depicts a longitudinal section of the replaceable slug of the reflectometer.
Figure 3:
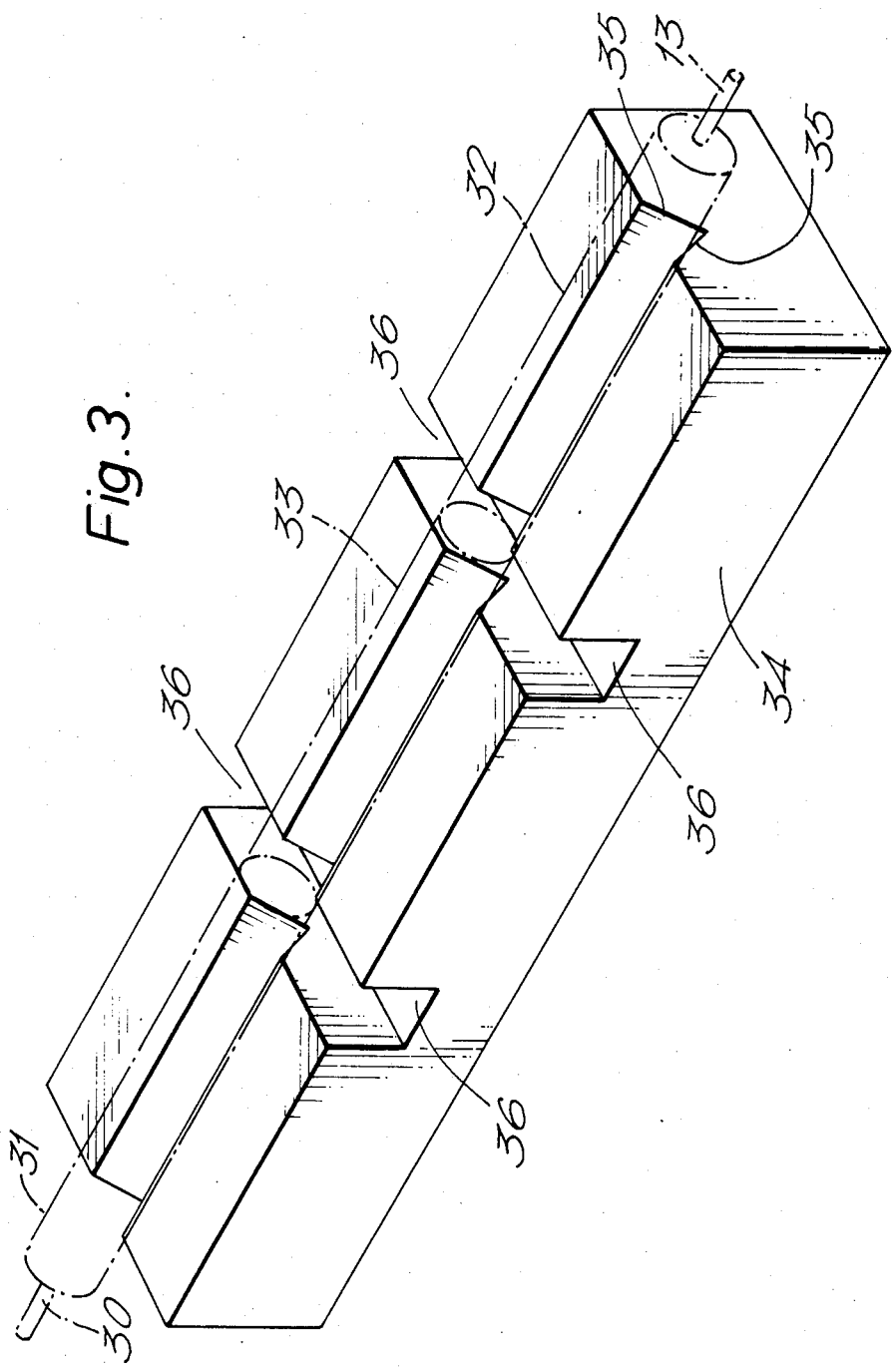
FIG. 3 depicts a perspective view of the connector which holds the ferrule terminated fibre of the reflectometer coupler, the slug, and the test fibre in optical alignment.

In the connector 12 the optical fibre 30 (FIG. 3) of the coupler 10 providing the second port of the coupler is terminated with a ferrule 31, while the test fibre 13 is similarly terminated with a ferrule 32. These ferrule terminated optical fibres are not directly butted together, but are optically coupled by means of a slug 33 through the axis of which is threaded a stub length of optical fibre 20 (FIG. 2). The connector assembly has a block 34 in which a Vee-groove 35 is provided. This groove may be divided into three sections by means of two slots 36. The two ferrules 31, 32 and the slug 33 are held in alignment in the Vee-groove by individual leaf-springs (not shown) which separately urge each of these three components into the appropriate section of the Vee-groove 35. The slots 36 are positioned so that both ends of the slug 33, and both inward facing ends of the ferrules 31 and 32 are left unsupported by the walls of the Vee-groove. This positioning of the slots also facilitates the application of index matching liquid (not shown) to the interfaces between the slug and the ferrules.

The ferrule terminations may conveniently be of the jewelled ferrule type generally as described in U.S. Pat. No. 4,351,586. The slug 33 containing the stub length of fibre 20 can be constructed according to a development of the jewelled ferrule concept, and consist of a ferrule provided with a jewel at each end. It is however preferred to use a single component for the slug, instead of three separate components, as this is easier to fabricate to the required tolerances.

A preferred material for the single component slug is an alumina ceramic sleeve. Typically this is about 1 cm long, and has an external diameter of 1.8 mm, which is equal to that of the ferrules 31 and 32. The slug is provided with an axial bore just large enough to freely accommodate the fibre, having a clearance typically in the region of 1 micron around the fibre 20. One end of the bore is flared to facilitate insertion of the fibre. The plastics primary coating on the fibre 20, provided to protect its surface from atmospheric attack, is stripped off and the exposed glass surface is lubricated with epoxy resin before insertion of the fibre into the slug bore so that the ends of fibre protrude beyond the ends of the slug. Further resin is then applied to form fillets 22. Then, after the resin has been cured, the excess fibre is cropped off and the ends of the slug are lapped flat and polished.

We claim:

1. An optical fibre reflectometer, which reflectometer includes a biconical multiport optical fibre coupler one port of which is optically coupled with an optical source, a second port of which is ferrule terminated for optical coupling with a test fibre, and a third port of which is optically coupled with a photodetector, wherein the ferrule of the second port is fitted in an optical fibre connector provided with a replaceable slug threaded by a stub length of optical fibre that is optically interposed between the optical fibre in the ferrule and the test fibre.

2. A reflectometer as claimed in claim 1, wherein the replaceable slug is provided by a ceramic sleeve having an axial bore just large enough to freely accommodate the stub length of fibre before it is secured therein with adhesive.

3. A reflectometer as claimed in claim 1, wherein the connector holds the ferrule terminated fibre of the coupler, the slug, and the test fibre in alignment by means of a Vee-groove.

4. A reflectometer as claimed in claim 3, wherein the connector Vee-groove is slotted in the region of both ends of the slug such that these ends and the abutting ends of the test fibre and the ferrule terminated fibre of the coupler are left unsupported by the walls defining the Vee-groove.

* * * * *